July 23, 1935.    E. PRICE    2,009,121
BRAKE APPARATUS
Filed Aug. 1, 1934
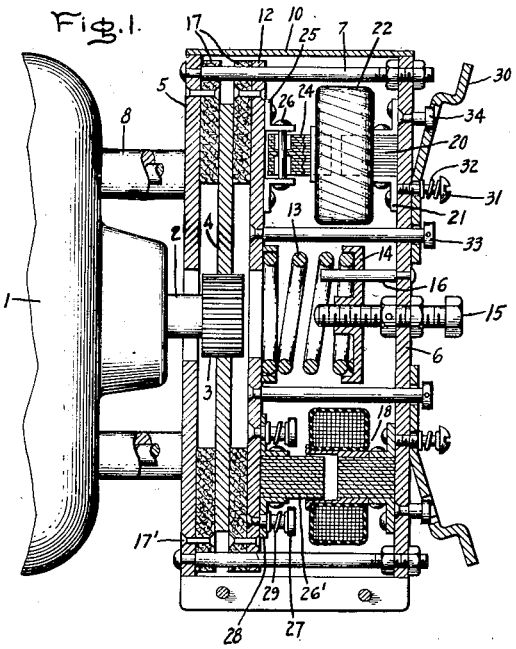
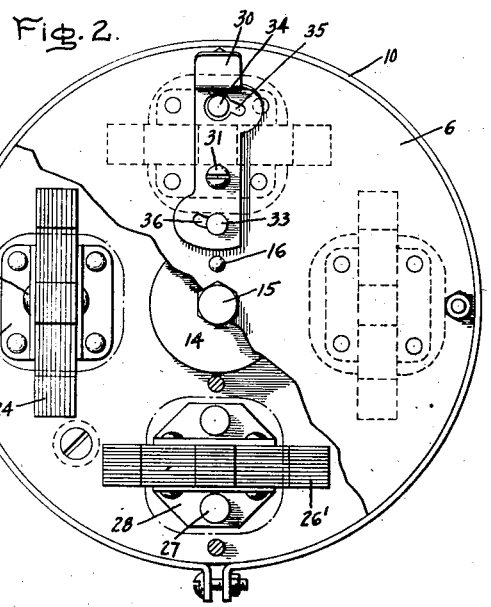
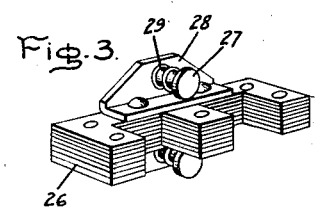
Inventor:
Edgar Price,
by Harry E. Dunham
His Attorney.

Patented July 23, 1935

2,009,121

UNITED STATES PATENT OFFICE 2,009,121

BRAKE APPARATUS

Edgar Price, Schenectady, N. Y., assignor to General Electric Company, a corporation of New York Application August 1, 1934, Serial No. 737,946

4 Claims. (Cl. 188—171)

My invention relates to brake apparatus of the disk type and in which the brake is applied by a spring and is released by electromagnetic means actuated by alternating current. It is the object of my invention to provide an improved brake apparatus of this type which is simple in construction, efficient and quiet in operation and inexpensive to manufacture.

My invention will be better understood from the following description taken in connection with the accompanying drawing, and its scope will be pointed out in the appended claims.

Referring to the drawing, Fig. 1 is a cross-sectional view illustrating an embodiment of my invention, Fig. 2 is an end view of the same with parts broken away, and Fig. 3 is a perspective view of a detail of the construction.

In the drawing I have shown my invention as applied to the electric motor 1. On the shaft 2 of the motor is the hub 3 to which the brake disk 4 is connected by a suitable spline or splines whereby the disk is rotated by the hub but is free to move axially thereon.

The fixed part of the brake apparatus comprises the plates 5 and 6 which are secured together by the rods 7 and are fixed to the motor casing by means of the rods 8. The space between the plates 5 and 6 is shown enclosed by the band 10 which protects the apparatus from dust and dirt. On the side of the brake disk 4 opposite to the plate 5 is the movable plate 12 which is mounted to slide in an axial direction on the rods 7 and which is pressed toward the brake disk by means of the spring 13. This spring engages plate 12 at one end and the adjustable plate 14 at the other end and into the latter plate there is threaded the adjusting screw 15 by which the pressure exerted by the spring may be varied at will. The small pin 16 fixed to plate 6 prevents rotation of adjusting plate 14 when the screw 15 is turned. Rings 17 of suitable friction material lie between the brake disk 4 and the plates 5 and 12 and are provided with openings to receive the rods 7 whereby they are restrained from rotation. If desired, they may be attached to the adjacent plates 5 and 12 by means of small rivets, such as are shown at 17', otherwise the rings may be permitted to move freely in an axial direction. If rivets are employed they are arranged near the periphery of the disks and beyond the edge of the brake disk 4 whereby as the disks wear away in service there will be no danger of their becoming scored by the rivets.

For withdrawing the plate 12 from the brake disk in order to release the brake against the force of the spring 13, I provide four equally spaced electromagnets 18. Each magnet comprises two similar core structures which preferably are E-shaped as shown for example by Fig. 3. Core structures 20 which may be considered as the field structures each is secured by means of the small angle plates 21 to the plate 6. On each of these core structures 20 is the energizing coil 22 which is shown surrounding the middle projection of the core structure.

Each core structure 24 comprising the armature member of each of three of the four electromagnets is secured to the movable plate 12 by means of the angle plates 25 in the same manner as that employed for securing the field core structures 20 except that each armature structure preferably is partly cut away where it engages the securing bolt 26, as shown in Fig. 1, in order to allow the core structure to have a slight rocking movement thereby facilitating the sealing of the field and armature members of each magnet when it is energized, it being understood that the field and armature structures of each magnet are adapted to move into actual engagement with each other. With the parts of the electromagnets thus engaged the movable plate 12 is withdrawn from the brake disk and the three magnets determine the limiting withdrawn position of the brake disk, the three electromagnets functioning in this respect in a manner similar to a three point support.

Inasmuch as the electromagnets of this apparatus are adapted to be energized by alternating current it is very desirable for well understood reasons that when the magnets are energized the core structures of all the magnets should form closed magnetic circuits, thus avoiding chattering and increasing the efficiency of the apparatus by reducing the final current flow in the magnet coils because of the high inductive reactance of the magnets. In order that the field and armature cores of the fourth magnet may move into complete engagement with each other when the corresponding elements of the other three magnets have engaged, I have provided a yielding connection between the armature core 26' of the fourth magnet and the plate 12 and I also provide for a slightly greater air gap between the field and armature core structures of this fourth magnet. As shown in Figs. 1 and 3, the yielding connection which I have provided between the armature core 26' and the plate 12 comprises the studs 27 secured to the plate and on which are slidingly mounted the angle plates 28 of the armature core. Between each angle plate and the head on the stud 27 is the coil spring 29. The tension of these springs 29 is such that when the electromagnets are energized all the armature cores will engage their respective field cores, the armature core 26' of the fourth magnet being drawn away slightly from the brake disk. Thus each electromagnet when energized will have its field and armature cores in engagement with each other notwithstanding the fact that there are four magnets for moving the same plate 12.

For the purpose of withdrawing the plate 12 from the brake disk manually and holding it in withdrawn position I have provided the means which I shall now describe. The two levers 30 are pivotally attached intermediate their ends to the outer face of the fixed plate 6 by means of the screws 31 having small springs 32 under the heads thereof. One end of each lever 30 connects through the rod 33 with the plate 12 while adjacent the opposite end of each lever 30 is an opening adapted to receive the head of the stud 34 fixed to plate 6. The opening in the lever has the narrow extension 35 which when the lever is depressed and rotated slightly engages the shank of the stud whereby the head thereof retains the lever in operated position after the manner of a bayonet joint. In order to accommodate the above-mentioned slightly rotative movement of the lever 30 the opening in the lever through which extends the rod 33 also is elongated as shown at 36 in Fig. 2.

What I claim as new and desire to secure by Letters Patent of the United States is:—

1. Brake apparatus comprising a fixed member, a rotatable disk, a movable plate, a spring for moving the plate into engagement with the disk to apply the brake and means for withdrawing the plate from the disk to release the brake, said means comprising a plurality of electromagnets each having cooperating core structures fixed to said member and to said plate and adapted to engage each other to determine the brake release position of said plate, an electromagnet having similar core structures secured to said fixed and movable members and means for yieldingly securing one of said similar core structures to its member.

2. Brake apparatus comprising a fixed member, a rotatable disk, a movable plate, a spring for moving the plate into engagement with the disk to apply the brake and means for withdrawing the plate from the disk to release the brake, said means comprising three electromagnets each having a core structure secured to the fixed member and cooperating core structure secured to the plate, the core structure of each magnet being adapted to engage each other thereby forming a three point stop for said plate, a fourth electromagnet comprising core structures secured to said fixed and movable members and resilient means connecting one of the core structures of said fourth magnet to the member to which it is secured.

3. Brake apparatus comprising a fixed member, a rotatable disk, a movable plate, a spring for moving the plate into engagement with the disk to apply the brake and means for withdrawing the plate from the disk to release the brake, said means comprising four electromagnets each including a field core secured to the fixed member and an armature core secured to the plate, the cores of each magnet being adapted to engage each other when energized, the means securing one of said armature cores to the plate comprising a spring arranged to permit a limited movement of the core relative to the plate.

4. Brake apparatus comprising a fixed member, a rotatable disk, a movable plate, a spring for moving the plate into engagement with the disk to apply the brake, means comprising a plurality of electromagnets for withdrawing said plate from said disk to release the brake and means for manually withdrawing said plate from said disk to release the brake comprising a plurality of levers each fulcrumed intermediate its ends on said fixed member and adapted to be moved in one direction to release the brake, a connection between said plate and one end of each lever and means between the fixed member and the other end of each lever for retaining the lever in operated position in response to a movement of the lever transversely to said one direction.

EDGAR PRICE.